Patented Oct. 30, 1945

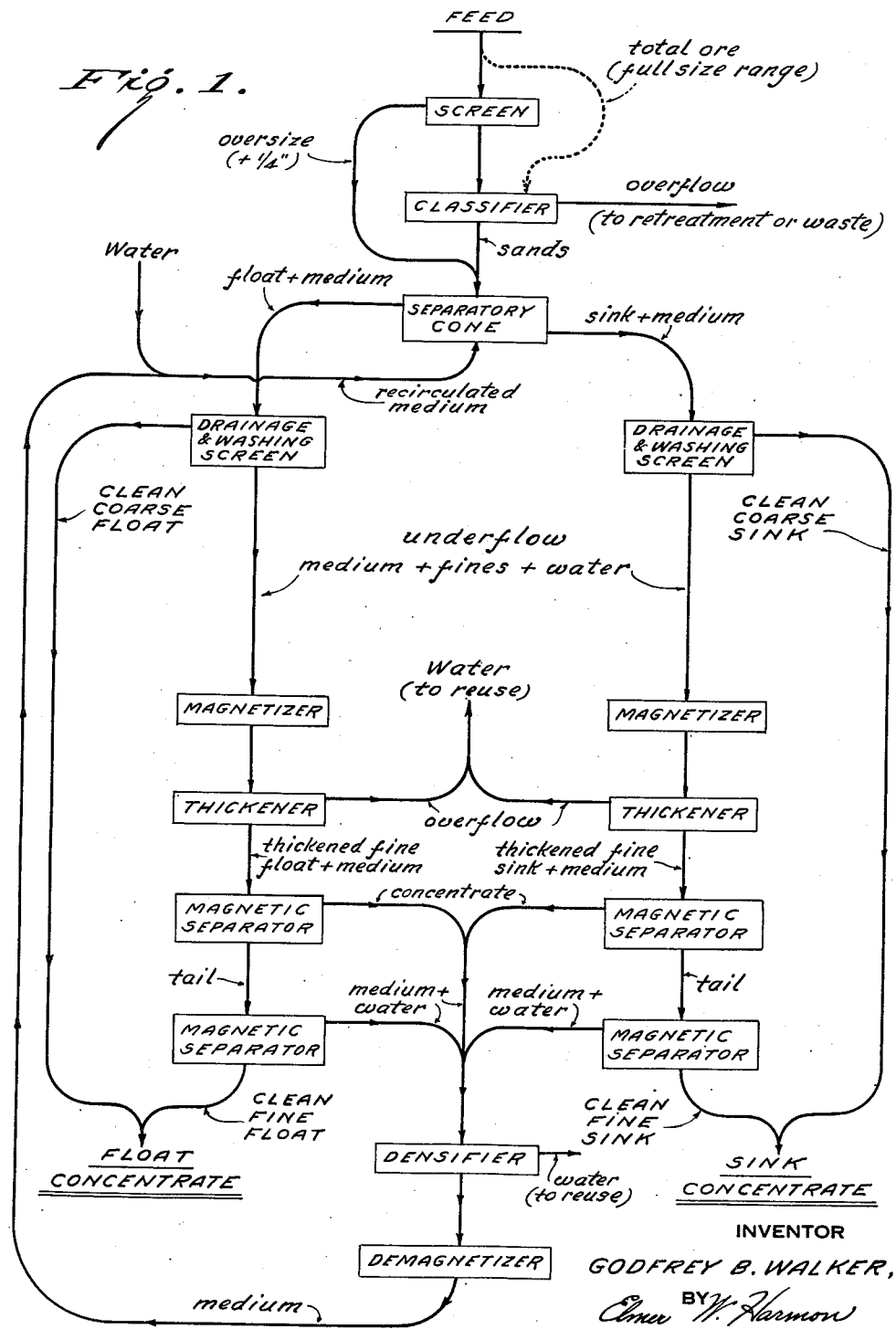

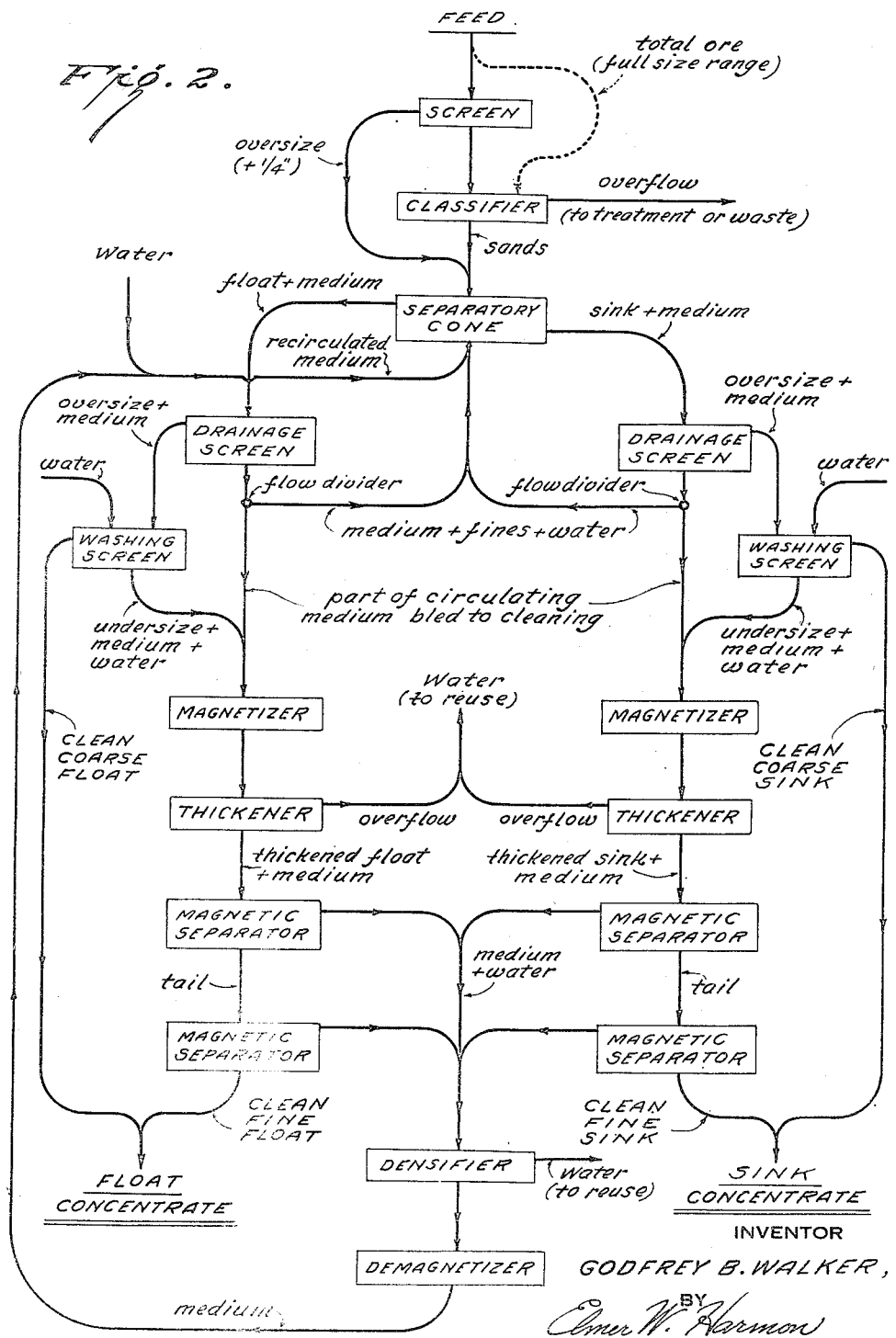

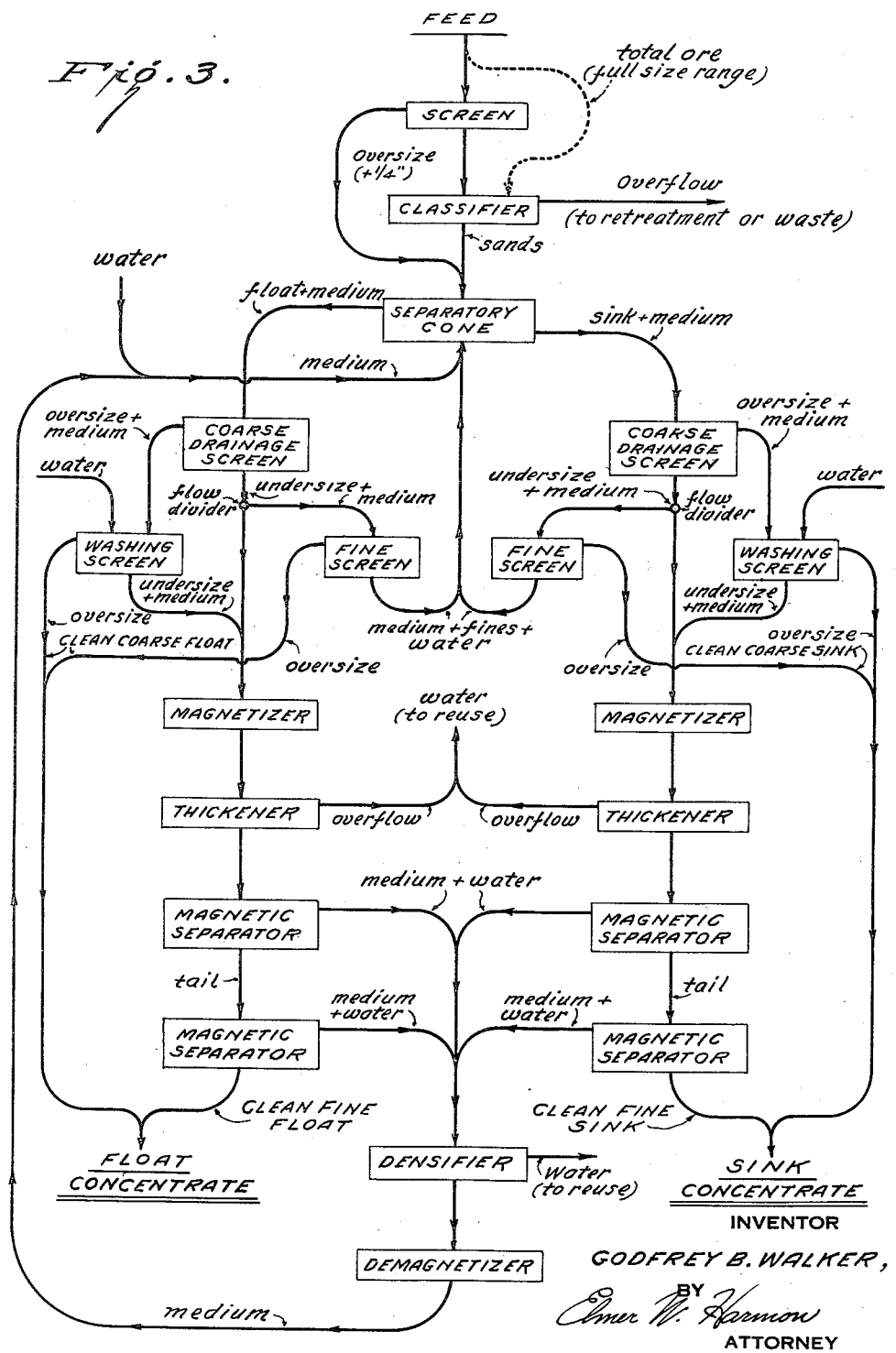

2,387,866

UNITED STATES PATENT OFFICE 2,387,866

HEAVY MEDIA SEPARATION PROCESS

Godfrey B. Walker, Old Greenwich, Conn., assignor to American Cyanamid Company, New York, N. Y., a corporation of Maine Application September 22, 1943, Serial No. 503,333

6 Claims. (Cl. 209—173)

This invention relates to the separation of heterogeneous mixtures of solid particles having different densities and contemplates the provision of an improved process of effecting such separation. More particularly, the invention relates to an improved handling process whereby two or more solids of different specific gravities, each of which is present in widely different size ranges, may be effectively separated.

Considerable interest has been shown in recent years in the so-called "sink-and-float" separation of mixtures of solid particles. This field includes a number of different processes for the separation of mixtures of materials by taking advantage of the different settling rates or particles having different specific gravities in a fluid of the proper density. In its simplest form, a mixture of two kinds of solid particles of different specific gravities is immersed in a fluid having a density greater than one solid and less than the other. The mixture is thereby separated into its component parts by the tendency of the heavy materials to sink and the lighter materials to float. Various modifications have been proposed for adapting this separation for use in continuously-operating processes.

In the application of these processes various liquids having a high specific gravity may be employed, but those most commonly used comprise suspensions of suitably-sized solids or "medium" in water. A part of the solids is usually colloidal or semi-colloidal in size. Particles in this size range not only remain suspended but also are capable of maintaining the remaining somewhat larger-sized particles in more or less permanent suspension. By properly selecting the solids, fluids of substantially any desirable density can be prepared. Using fluids of properly selected density it is perfectly feasible to separate solids which differ in specific gravity by 0.01–0.05 of a point.

Industrially, the continuously-operating modifications of the process have been particularly attractive to the mining industry for use in the beneficiation of low grade ores. These processes are particularly well adapted to large-scale operation. At the same time, they operate on a relatively low total cost per unit of product. Consequently, the use of these "heavy-media" processes in this field has become commercially very important. Since the practice in ore beneficiation involves those problems which the present invention is intended to solve, it will be taken as illustrative although the process is not necessarily so limited.

Despite the obvious advantages of heavy-media separation it also possesses certain limitations. The most serious of these limitations is the fact that from the cost standpoint it becomes less and less efficient as the size of the materials to be separated is decreased. Consequently, a fine feed can not be economically handled. Particularly, does this difficulty become noticeable when attempts are made to handle feed having a wide range of particle sizes. Industrially, it is ordinarily desirable to handle a feed coarser than about one-quarter inch.

This inefficiency in handling fine feed is due to a number of different reasons. First of all, the high-density fluid is of necessity carefully prepared. The initial cost of the solid medium may vary from about $20–$125 per ton and even relatively small operations may require as much as one hundred tons in circulation. In consequence, the medium must be recovered, cleaned and reused if the operation is to be considered practicable.

Heretofore, this recovery required extensive tabling, settling and the like equipment which not only inordinately increased the fixed charges, but was even then incapable of making a good separation. The presence of fine materials in the feed still further increased the difficulty in recovering the medium. The loss of medium was relatively high and became progressively higher as the amount of fines in the feed increased. Because fixed charges for the original medium can not be increased beyond a certain point by replacement costs without destroying the economic advantage of the process this was a definite limitation.

Many attempts have been made to develop processes whereby heavy-media separation can be applied to unsized feed which includes particles of widely different size. In the better of these processes, a large pool of medium and ore is maintained in and recycled through the concentrator. Such processes have the advantage of being able to handle much smaller feed than can be treated in a straight sink-and-float operation.

Even the better of these processes, however, have certain practical and economic limitations. For example, these processes can not handle coarse feed economically. The coarser the feed, the greater the amount of material which must be recycled in order to maintain the conditions necessary for effective concentration, and therefore the lower the through-put capacity. While a good concentration can be obtained with a fairly coarse feed if enough water flow is used and enough ore is recycled, economic considerations impose a definite upper limit on the feed size. For hematite ores, for example, this upper limit is ordinarily about one-quarter inch. Moreover, none of these modified processes are as efficient as a straight sink-and-float concentration.

Consequently, there remained a definite need in industry, particularly in the beneficiation of ores, for a suitable process which is not subject to these limitations. A process is desired which is generally adapted to handle a feed containing a wide range of particle sizes. At the same time the process must be one which is not wasteful of the high-density medium used in carrying out the separation.

It is, therefore, the principal object of the present invention to develop a process whereby the advantages of heavy media separation may be obtained in the treatment of an unsized feed. It is also a further object of the invention to provide a process which will greatly increase the range of particle sizes over which true concentration without classification is obtained. It is a still further object of the invention to provide such a process which is not subject to the practical and economic limitations of the processes proposed by the prior art.

In general, the principal objects of the present invention are accomplished by making use of magnetic medium in making up the high density fluid and taking advantage of its magnetic susceptibility to effect a satisfactory separation and recovery of the medium from the ore products. The process of the invention also provides a fluid-flow circuit containing screens of suitable mesh arranged so that a wide range of feed sizes may be used. In conjunction with properly located magnetic separators, this process enables effective concentration without the excessive losses of medium encountered in attempting to handle small size particles in the sink-and-float processes of the prior art.

The invention is more clearly set forth in connection with the accompanying drawings. These drawings set forth the fluid-flow circuit of the present invention and several possible modifications of the same adapted to special circumstances.

In these drawings:

Figure 1 represents the basic flow circuit;

Figure 2 represents a modification of the process in which a portion only of the medium is continuously cleaned; and Figure 3 represents a still further modification in which in addition to continuously cleaning only a portion of the medium, the directly recycled portion is subjected to a further screening operation.

With regard to the general flow scheme as illustrated, for example, by Figure 1, it will be noted that the feed comprises the total ore. Under certain circumstances this may comprise the ore directly as obtained. However, it is customary in practice to break down the ore for convenience in handling. Feed to the processes of the present invention will therefore ordinarily comprise ores, or other materials, which ordinarily have a maximum size of about two inches, but may be somewhat larger. It is also usual in the practice to wash the crushed ore. This is helpful but not essential in the operation of the present invention.

According to the present invention, crushed ore is then ordinarily passed to a coarse screen in which the coarser materials are roughly separated from the fines. This screen is usually of a size such that it can be made out of cheap materials. It is coarse enough to withstand considerable wear and need be replaced only at much longer intervals than required when more expensive fine screens are used. An excellent practical size is found to be about ¼ inch, although this may be varied in either direction if so desired.

Screen oversize material (in the case of the illustrative example the plus ¼ inch material) is passed directly to a heavy-media separation cone. The screen undersize, i. e. minus ¼ inch material is sent to a classifier, which may be any one of several well-known available forms. The classifier sand constitutes additional feed to the separatory cone and the overflow ordinarily is passed to waste, but may be subjected to additional treatment if so desired.

Use of the screen is not essential to the operation of the present process. The whole ore may be passed directly to the classifier, as shown by the dotted line in Figure 1. To do so, however, is more expensive since it requires a much larger apparatus and greater water flow in order to accomplish the same eventual result. In addition, directly classifying the whole feed requires the classifier to handle a large bulk of the material without performing any useful operation on the coarser sizes. The use of a screen to bypass the coarse material is therefore definitely to be preferred.

Commercially available classifiers are usually adjustable to make a separation at almost any desired particle size. In the present process this size is so chosen as to remove substantially all the material below the finest size permitted by conditions in the separatory cone. These conditions vary among other factors with the difference in specific gravity between the sink and float fraction, the viscosity and density of the medium and the cone size.

While for any one operation there is a minimum useful feed size, it can not be definitely fixed for all cases, and varies with the conditions and the materials to be treated. As a general practice this has been found to be approximately 65 mesh. It is therefore apparent that the present overall process will handle a feed including all material below about plus 65 mesh. This is a distinct advantage over most of the sink-and-float procedures, which, as has been noted above are for most purposes limited to a feed of about plus ¼ inch.

The sands, or underflow from the classifier, together with the coarse-screen oversize are fed to the separatory cone. This cone also is a standard design which is commercially available. Material to be treated is fed in at the top of the cone. Overflow from the cone, comprising the lighter "float" portions of the feed plus medium is overflowed in the usual manner. Circulating medium is introduced into the cone at any selected point or points desired and the heavy, or "sink" fraction is withdrawn from the bottom of the cone in the usual manner.

The overflow or "float" fraction is passed directly to a draining and washing screen. Again, the mesh-opening of this screen can not be definitely fixed since it may be desirable to alter it somewhat in accordance with circumstances. Screens as fine as ten mesh have been used satisfactorily. Preferably, however, these should be made of stainless steel. Finer screens are not generally practicable at this point in the present process because capillary attraction retards the passage of the medium through the openings to such a degree that efficient separation of the medium from the ore does not result. In addition, there is a very definite economic limitation. Initial costs and upkeep on stainless steel screens increases very rapidly as the mesh becomes finer, so that it is desirable to use as large a size as possible. It is, therefore, preferable to use a screen coarser than ten mesh wherever practical to do so.

Screen oversize, which constitutes a clean, coarse float fraction, may be separately collected if so desired. Ordinarily, however, it is made a part of the eventual float concentrate as shown in Figure 1. The undersize, comprising essentially fines, medium and water is then ordinarily passed through a magnetizing block and then to a thickener in which excess water is removed as shown in Figure 1. This water may be recycled to any stage of the process in which it is needed. While the use of the magnetizer and thickener in this way is definitely preferable, it is not essential. It is possible to pass the material directly to the magnetic concentrators. However, this requires an unnecessarily great capacity in the latter.

This fine and medium mixture, as pointed out preferably thickened, is then fed to a magnetic concentrator, which again may be any one of several standard forms which are commercially available. The magnetic concentrator tailings are passed through one or more magnetic concentrators, emerging as a clean, fine float fraction. Again, this fraction may constitute a product in itself but is usually combined with the clean, coarse float from the draining and washing screen as shown in Figure 1. Overflows from the various magnetic concentrators, comprising essentially medium plus water, may be separately treated but are ordinarily combined as shown in Figure 1.

Underflow from the separatory cone, comprising the heavy or "sink" fraction and medium is separately treated. However, the treatment is the same as that given the float fraction, being carried out in a duplicate set of apparatus. A clean, coarse fraction and a clean fine fraction is obtained, as in the case of the float, and again these fractions may be either kept separate or combined as a single sink concentrate.

In the case of both the sink and the float fractions, the number of magnetic concentrators used may vary. It has been found that the use of a pair in series on each of the fractions, as shown in Figure 1, ordinarily produces very satisfactory results. The invention, however, is not meant to be so limited. Only a single concentrator may be used if so desired. On the other hand, three or even more may be useful in some cases. Nor is it essential that both the sink-and-float fractions be treated in an identical number of machines. In some cases, depending upon such factors as the capacity of the separators, the necessary throughput and the nature of the materials, the use of one or two separators may be satisfactory for one fraction and a larger series necessary for the other. The main features of the operation of the process is not, however, altered by the size or number of separators used in each case.

In treating both the sink and the float fractions, concentrate from the magnetic concentrators comprises essentially medium and water. These suspensions are ordinarily too dilute to be directly recycled. Accordingly, the magnetic concentrator discharge is passed to some form of dewatering device of standard type, such, for example, as the well-known Akins Classifier or Densifier. In this way, excess water is removed and thickened sludge or medium is obtained. This thickened medium is then passed through a suitable demagnetizer and the thickened and demagnetized medium is recycled to the separatory cone. It may be desirable to adjust the density of the returning medium to that being used in the cone. This is readily done by the addition of water thereto immediately preceding its introduction into the cone.

If so desired, the concentrates from the magnetic separators used in connection with the cleaning of the float and the sink fractions may be separately treated. However, in any case the medium will be combined after being demagnetized and before being returned to the cone. It is wholly practical and much simpler, however, to combine these overflows before carrying out the densification and demagnetization. This arrangement is shown in Figure 1.

Since no effort has been made in the present process to accurately size the feed, as by screening, before treatment, and since not doing so is in fact one of the principal advantages of the invention, the provision for the handling of slimes should be noted. First of all, a major portion of the slimes is carried off in the overflow from the classifier along with the material which is too small in size for effective concentration in the cone. This portion of the slime, being removed from the circuit almost at the outset, causes no problem in the subsequent operations.

Secondly, the principal difficulty caused by the presence of slimes in the processes of the prior art has been in the recovery of the medium therefrom. Both medium and slimes are ordinarily very fine in size and may not greatly differ in specific gravity. Due to these factors, they cannot be readily separated by settling, tabling and the like. However, since in the present invention the medium used is one which is highly magnetic there is no difficulty in separating it from the fines or even slimes in a magnetic separator.

Since the slimes of many ores are ordinarily of less specific gravity than the rest of the ore, they may be removed by the classifier in the overflow therefrom. Such slimes as are not removed by the classifier eventually are collected in the float concentrate, the sink concentrate in such cases being ordinarily free therefrom. It is for this reason that it may be advantageous in some cases to maintain the clean coarse float from the draining and washing screens separately from the fine float which is removed from the magnetic concentrators. Where the fine float concentrate comprises a useful product, it may be subsequently deslimed to improve the grade if so desired.

As was pointed out, the principal purpose in the further treatment of the underflow from the draining and washing screens of Figure 1, is to separate the magnetic medium from the fines. But for the presence of the latter, underflow from the drainage screens and the thickened, washing-screen, underflows could be directly recycled to the cone, as the high density fluid. However, such direct recycling can be done only to a limited extent. It is readily apparent that there is a maximum amount of fines which can be tolerated, since an excess will increase the viscosity of the medium to the point where it loses its effectiveness. In the basic flow scheme of Figure 1, none of the screen underflows containing both medium and fines were directly recycled.

Wherever practical, it is highly desirable to recirculate part of the underflow from the drainage screens directly to the cone. There is not only the direct saving in not cleaning any more medium than necessary but there are several additional advantages. Recycling uncleaned medium decreases the capacity of the cleaning apparatus required and also reduces the amount of magnetic medium required to fill the apparatus. One modification of the flow scheme of Figure 1 adapted to permit use of some uncleaned medium in this manner is shown in Figure 2.

Again, since the "sink" and "float" fractions receive similar treatments, the float fraction will be taken as illustrative. Overflow from the separatory cone, comprising essentially the float fraction plus medium is sent to a drainage screen. This screen is adapted to remove the coarser particles in a size range substantially free from fines, slimes, and medium. Again, the size can not be definitely fixed for all cases. On the average, about six mesh is satisfactory. Overflow from this screen, comprising the oversize float and medium, is passed to a washing screen. Oversize from the latter, which comprises clean, coarse float, may be either separately collected or mixed with the fine float to form a combined float concentrate as in Figure 1. The underflow from the washing screen passes to the magnetizer, thickener, and magnetic separator combination as in Figure 1.

Underflow from the drainage screen, however, is given a treatment which differs from the original flow scheme. This underflow is divided into two parts. As large a proportion as possible, without exceeding the permissible amount of fines and slimes in the separatory cone, is directly recycled to the cone as part of the high-density fluid. The remainder is mixed with the underflow from the washing screen and passed through that part of the process in which medium is separated from the fines. As pointed out, a similar arrangement is provided for handling the sink fraction.

In maintaining the apparatus used in the flow schemes of Figures 1 and 2, trouble is sometimes encountered with ores which contain large amounts of coarser sized ores in either the sink or float fraction. This causes excessive wear of the relatively fine-mesh screen used in the drainage operation. A flow scheme designed to overcome this difficulty is shown in Figure 3. The fine wire of Figures 1 and 2 is replaced by a coarser mesh, the screen oversize being separately sent to the washing operations and only a relatively small amount of screen undersize, free from excess coarse ore, is treated on a fine screen. In this way difficulty with excessive wear on the fine screen is eliminated.

The flow scheme outlined in Figure 3 also has an additional advantage. In dividing the underflow from the drainage screen and recycling it to the cone, it will be found that in many instances the fluid contains a considerable proportion of material of a size which can be readily removed therefrom by further screening. The flow scheme of Figure 3 is also designed to take advantage of this in collecting a third product fraction. This fraction is ordinarily added to the eventual concentrate, as shown in Figure 3. However, like the other product fractions it may be separately collected if so desired. Undersize from this fine screen constitutes essentially minus 65 mesh fines, medium and water and is directly recycled to the cone. Otherwise the process of Figure 3 is much the same as that shown in Figure 2.

From the foregoing discussion it will be apparent that the procedure of the present invention possesses a number of important advantages. First and most important, it permits handling an unsized feed and enables true concentration to be effected over a remarkedly wide range of from about plus 65 mesh to about minus 2 inches, or even coarser. It is also apparent that the process can be carried out quickly and easily and that there is very little loss of medium since the recovery system is remarkedly efficient. Further, and the not the least important advantage in some sections of the country, the process operates with a minimum water consumption, a large part of all the process water being capable of being collected and reused.

While a major part of the present discussion has been concerned with the treatment of ores, it also is apparent that the invention is by no means to be so limited. Other applications of the process will be apparent to those skilled in the art. It can be used, for example, in reclamation plants of separating different types of scrap having different specific gravities. One such application occurs in the separation of fiber from rubber while reclaiming the latter. Other good illustrations are the separation of grain from chaff, the separation of non-ferrous metal scrap, abrasives from metal scrap and many others. The process is therefore one which is highly flexible, the various steps being readily adjusted to varying conditions. Since a separatory medium of substantially any desired gravity can be prepared, the process can be adapted to separate almost any materials which are not harmed by being wet and which differ from each other by about 0.01 points in their specific gravities.

While the discussion of the present invention has been largely concerned with the formation of a float and a sink concentrate by using a single two-way cone, the process is not necessarily so limited. For example, either the float or the sink fractions from the separatory cone of Figures 1-3 may be passed to a supplementary cone in which it may be still further treated by a medium of different density. An additional set of screens, magnetizing blocks, thickeners and magnetic separators is readily installed to provide for an additional separation. Or, if so desired, a single three-way cone can in many instances be used to obtain an intermediate fraction without departing from the scope of the present invention.

Such additional fractions may also be taken for several different purposes. There may be a third desirable product. Again, the third fraction may comprise a considerable amount of coarse light material, which because of its size and/or inertia is not readily overflowed from the heavy media separatory apparatus combined with fine heavy material, which because of its relatively great surface as compared to its mass does not readily sink. In such a case, the ultimate deposition will depend largely on its composition. Depending on its grade, the fraction may be directly added to either the float or the sink concentrate. However, the oversize from the draining and/or washing screens, if the latter has the proper mesh for this fraction comprises relatively clean light material and is sent to the float concentrate. The screen undersize and magnetic concentrator tailings which contain the finer particle sizes may be classified as float or sink concentrates according to their content.

I claim:

1. In a continuous process of separating nonmagnetic particles of different specific gravities from mixtures thereof, at least one of the constituents being present in full size range; the combination of steps which comprises; immersing the entire mixture, including the minus 10, plus 65–100 mesh particles, in a body of heavy-density fluid, said fluid having suspended therein a sufficient amount of finely-divided, magnetically-susceptible material to produce an apparent fluid density between the specific gravities of the material to be separated; collecting the light fraction which floats and the heavy fraction which sinks; separately subjecting both the light and heavy fractions to an operation which combines the steps of subjecting said fractions to at least one magnetic separation, whereby any magnetizable material becomes magnetized and substantially all of the magnetically-susceptible material in each fraction is separated therefrom; collecting and demagnetizing said separated magnetized material becomes magnetized and substantially to the main body of heavy-density fluid and separately collecting the residues after removal of said magnetically-susceptible material from the fractions as clean light and clean heavy product fractions.

2. In a continuous process of separating nonmagnetic particles of different specific gravities from mixtures thereof, at least one of the constituents being present in full size range; the combination of steps which comprises; classifying the mixture, making the size cut at about 65–100 mesh; immersing the entire oversize fraction, including the minus 10, plus 65–100 mesh particles, in a body of heavy-density fluid, said fluid having suspended therein a sufficient amount of finely-divided, magnetically-susceptible material to produce an apparent fluid density between the specific gravities of the material to be separated; collecting the light fraction which floats and the heavy fraction which sinks; separately subjecting both the light and heavy fractions to an operation which combines the steps of subjecting said fractions to at least one magnetic separation, whereby any magnetizable material becomes magnetized and substantially all of the magnetically-susceptible material in each fraction is separated therefrom; collecting and demagnetizing said separated magnetized material; returning said demagnetized material to the main body of heavy-density fluid and separately collecting the residues after removal of said magnetically-susceptible material from the fractions as clean light and clean heavy product fractions.

3. In a continuous process of separating nonmagnetic particles of different specific gravities from mixtures thereof, at least one of the constituents being present in full size range, the combination of steps which comprises; classifying the mixture, making the size cut at about 65–100 mesh; immersing the entire oversize fraction, including the minus 10, plus 65–100 mesh particles, in a body of fluid having suspended therein a sufficient amount of finely-divided, magnetically-susceptible material to produce an apparent fluid density between the specific gravities of the material to be separated; collecting the light fraction which floats and the heavy fraction which sinks; separately subjecting both the light and heavy fractions to an operation which combines the steps of draining and washing on suitable screens, whereby each fraction is separated into a clean, coarse screen oversize and a screen undersize mixture comprising fines, magnetic material and an excess of water; separately collecting both said screen oversize fractions as light and heavy products, separately subjecting both said screen undersize fractions to at least one magnetic separation, whereby any magnetizable material becomes magnetized and substantially all of the magnetically-susceptible material in each fraction is separated therefrom; collecting and demagnetizing said separated magnetized material; returning said demagnetized material to the main body of heavy-density fluid and separately collecting the residues after removal of said magnetically-susceptible material from the screen undersize fractions as additional clean light and clean heavy product fractions.

4. A process according to claim 3 in which the screen undersize from the draining and washing screens is passed through a magnetizer, whereby the magnetic material in said screen undersize becomes magnetized, and said magnetically-treated material is dewatered before being treated to separate the magnetically-suscepticle material therefrom.

5. A process according to claim 3 in which both the light and heavy fractions separated by the heavy-media fluid are collected and separately passed to drainage screens, and at least a portion of the drainage-screen underflow is reused directly as a part of the heavy-media liquid in treating subsequent portions of the particle mixture.

6. A process according to claim 3 in which the light and heavy fractions, after being separated by the heavy-media fluid are separately passed to drainage-screens and at least a portion of the undersize from each of said drainage-screens is rescreened, the oversize from said rescreening operation being collected as product and at least a part of the rescreening undersize being directly turned to the main body of said heavy-media fluid.

GODFREY B. WALKER.

Certificate of Correction

Patent No. 2,387,866.  October 30, 1945.

GODFREY B. WALKER

It is hereby certified that error appears in the printed specification of the above numbered patent requiring correction as follows: Page 5, first column, line 25, claim 1, strike out "becomes magnetized and substantially" and insert instead the semicolon and words; *returning said demagnetized material*; and that the said Letters Patent should be read with this correction therein that the same may conform to the record of the case in the Patent Office.

Signed and sealed this 10th day of December, A. D. 1946.

[SEAL]

LESLIE FRAZER,
*First Assistant Commissioner of Patents.*